June 30, 1931.  A. J. SACKETT  1,812,450
MIXER
Filed July 14, 1928   2 Sheets-Sheet 1

Inventor
Augustus J. Sackett
By Edwin H. Samuels
Attorney

June 30, 1931.  A. J. SACKETT  1,812,450

MIXER

Filed July 14, 1928  2 Sheets-Sheet 2

Witness
Inventor
Augustus J. Sackett
By Edwin Hammell
Attorney

Patented June 30, 1931

1,812,450

UNITED STATES PATENT OFFICE

AUGUSTUS J. SACKETT, OF ANNE ARUNDLE COUNTY, MARYLAND, ASSIGNOR TO THE A. J. SACKETT AND SONS COMPANY, A CORPORATION OF MARYLAND

MIXER

Application filed July 14, 1928. Serial No. 292,614.

The invention relates to a machine which is primarily intended for mixing fertilizer materials, as ground phosphate rock and acid, though it may be applied to the mixing of various ingredients, solid or liquid, as well as to the combining and mixing of solid and liquid materials. It will be understood that the machines referred to are ordinarily of large capacity, the average machine being about eight feet in diameter.

In accordance with the previous practice such machines have been made with a rotary container, the mixing blades rotating about axes spaced outwardly from the center of rotation of the container so as to provide a motion of translation of the mixer blades or, more particularly, the axis of each blade, relatively to the container. In order to rotate the container it is necessary to support the container and the entire mix or batch of material being mixed on suitable bearings, which must have a capacity corresponding to this combined weight and also to provide sufficient power to accelerate and rotate this mass and to overcome the friction due to the weight of the material and the container.

The object of the invention is to provide a mixer having the desired translatory motion of the mixer blades, or the axes thereof relatively to the container, without the necessity for rotating the container and the entire batch of material, and incidentally for providing rotary bearings for supporting this combined weight in rotation.

In the accompanying drawings I have illustrated a mixing machine embodying the features of my invention in the preferred form.

Figure 1:
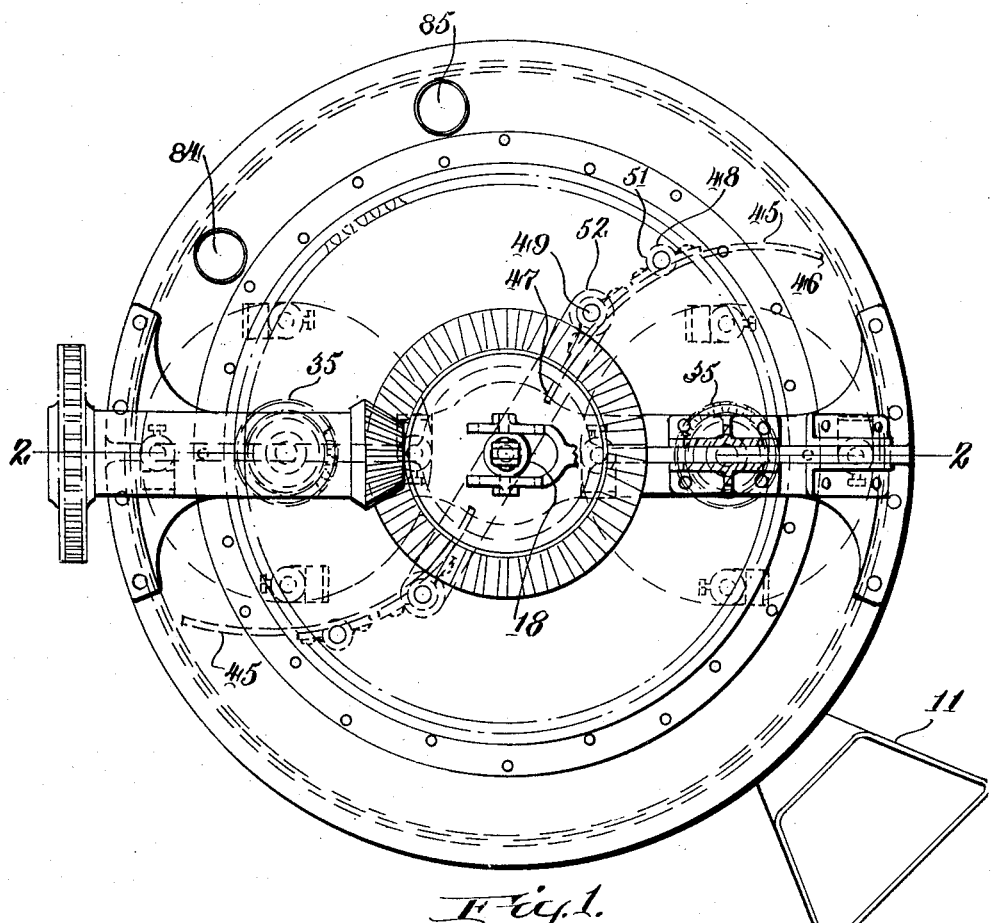
Figure 1 is a top plan view of the machine.
Figure 4:
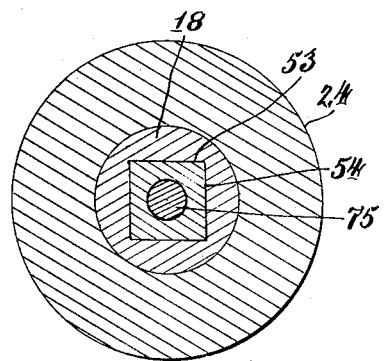
Figure 4 is a horizontal section on the line 4—4 of Figure 2.

Referring to the drawings by numerals, each of which is used to indicate the same or similar parts in the different figures, the machine in the preferred form, as illustrated, the details shown being capable of wide variation, includes an upright cylinder 1 having a mixing chamber or container 2 occupying the upper portion of the cylinder. The floor or bottom wall of the chamber, indicated by reference character 4, may, in the preferred embodiment of the invention shown, be in the form of a circular plate having a central valve opening 5 and a peripheral support 6 shown in the form of an angle iron secured to the inner wall of the cylinder 1 and having a horizontal flange 7 projecting inwardly around the entire circumference of the chamber.

In the preferred form illustrated, the floor or bottom plate 4 rests freely by gravity at its peripheral edge on the horizontally disposed flange 7 of the peripheral support 6, the outer zone 8 of the bottom surface of plate 4 engaging the top surface of flange 7 and forming a tight joint which may be closed by the materials used or in any suitable manner. The floor plate 4 is thus left free to expand and contract relatively to the side walls 9 of the container, which eliminates the tendency to buckle the container when the parts are unevenly heated.

Figure 3:
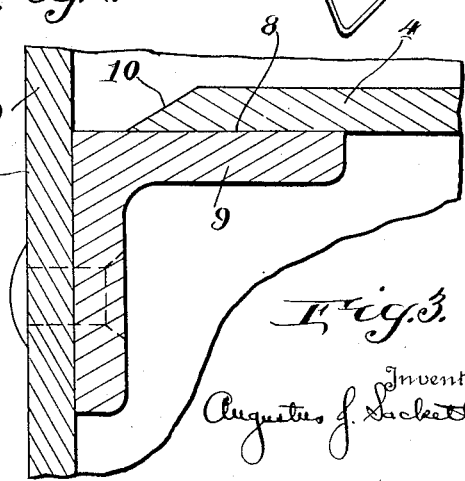
Figure 3 is a fragmentary radial section on the line 3—3 of Figure 1.

The outer peripheral edge of the bottom plate 4 is preferably beveled at the top at 10 as best illustrated in Figure 3, so as to prevent caking and clogging of the material between this edge and the side wall 9 of the cylinder.

The dry material may be admitted near the top from the side by way of a hopper 11, the top of the container being closed by an annular cover plate 12 which, in the preferred form illustrated, carries preferably, concentric with the chamber, a toothed gear 14 shown as an annulus having inwardly disposed teeth 15.

In the form illustrated, the annular cover plate 12 has a central opening 16 corresponding to the diameter of the annulus, in which opening is located a planetary gear carrier 17 shown in the form of a disk, though the exact form of the carrier is not essential. This disk 17 is supported at its center by a tubular shaft 18 which extends through the disk and may be secured thereto by means of a set screw 19 in the depending hub 20 of the disk.

Figure 2:
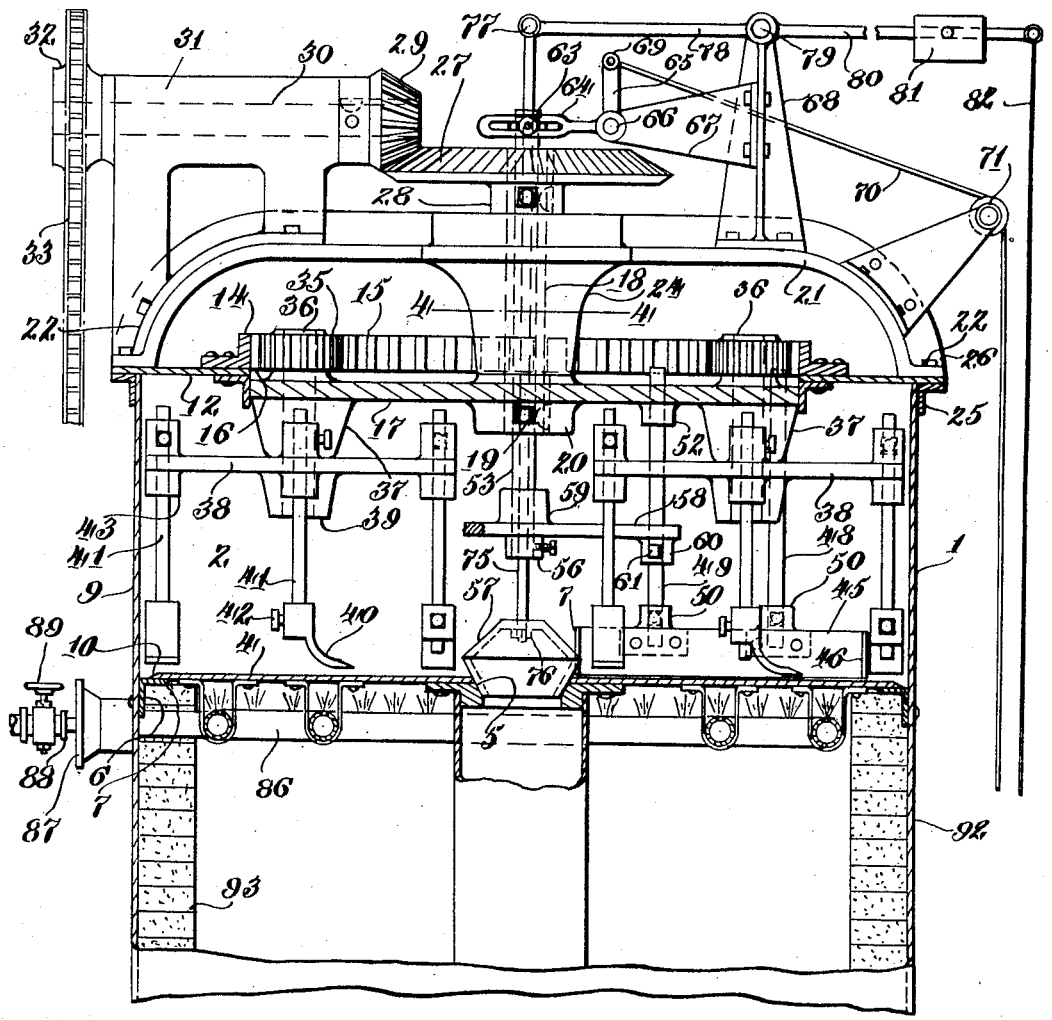
Figure 2 is a section through the casing on the line 2—2 of Figure 1, the working parts, i. e., the mixer, scrapers, gears, etc., being shown in elevation.

Over the annular cover plate 12 is a gear bracket or supporting arch 21, see Figure 2, secured at its ends at 22 to suitable points on the periphery of the cylinder at the top and having a depending central boss 24.

The drawing shows the top edge of the cylinder reinforced by means of an outside peripheral angle 25 which provides an outwardly projecting flange and the edge of the annular cover plate 12 overlies this flange, the arch or bracket 22 being secured to the flange by means of bolts 26 which extend downwardly through the ends of the arch or bracket 22 which rest on the edges of the plate, and through the plate 12 and through the angle 25.

The boss 24 of the bracket 22 provides a bearing for the shaft 18 which slides and rotates therein. A bevel gear 27 is secured to the upper end of this shaft and its hub 28 engages a suitable opposing surface on the top of the arch 22 supporting the planetary gear carrier 17, the shaft 18 and the gear.

The bevel gear 27 is driven by a bevel pinion 29 mounted on a shaft 30 turning in suitable bearings in a bracket 31 projecting upwardly from the arch 22, the shaft 30 being, in the preferred form of the invention shown, disposed in a horizontal plane.

This shaft may be driven in any suitable manner as by means of a sprocket 32 secured to its outer end and engaged by a chain 33.

The planetary carrier, shown as disk 17, is rotated by the bevel gear 27 through and by way of the shaft 18. This carrier 17 carries one or more planetary gears 35. In the form of the invention shown there are two of these gears, each of which meshes with the annulus 15 and is mounted on and secured to a shaft 36. Each of the shafts 36 is rotatively mounted in a boss 37 formed on the disk 17. In the form of the invention shown, this boss protrudes on both sides, i. e., above and below the disk and each said shaft carries at its lower end a relatively small stirrer blade carrier which may be a disk 38. The disks 38 receive a planetary motion or rotation from the planetary gears 35, i. e., they rotate about their own axes and also rotate with the planetary gear carrier 17 about the shaft 18.

Each of the stirrer blade carriers 38, it being understood that these blade carriers are situated inside the cylindrical container 1, is shown as provided with a central depending hub 39 which surrounds the shaft 36 and is secured thereto in any suitable manner. The top of each stirrer blade carrier 38 may bear directly against the lower end of the corresponding boss 37 on the planetary gear carrier.

Each of the stirrer blade carriers 38 is provided with a plurality of stirrer blades 40. In the form of the invention shown, there are four of these on each disk, each being mounted on a depending rod 41 to the end of which it is secured in any suitable manner, as by means of a set screw 42, the rods 41 being shown as extending in a vertical direction parallel to the axis through suitable bosses 43 arranged around the periphery of the stirrer blade carriers 38. The rods 41 with their stirrer blades are secured in the bosses 43 by means of set screws or in any suitable manner, being preferably adjustable vertically through the bosses 43 providing a vertical adjustment of the stirrer blades 40.

The planetary motion of the stirrer blades thus attained gives a mixing effect which is, at least, as effective as that resulting from the rotation of the container about an eccentrically placed rotating stirrer, and there is a very important saving in the cost of construction and operation, as pointed out in the preamble, particularly in that heavily burdened wearing parts are dispensed with.

The container is provided with a central valve opening 5 for the discharge of the mixed material and in order to assemble the mixed material from the sides of the container and deliver it to and through the valve opening at the center without the necessity for hand scraping of the container, rotary scraper and transfer blades 45 have been provided. These blades, as shown, are located in comparative close contact with the bottom wall 4 of the container and their forward ends 46 approach closely to the outer walls 9 of the container. The blades are inclined backwardly relatively to the radii, i. e., contrary to the direction of rotation, from the outer ends 46 to the inner ends 47 which are adjacent the valve opening. These blades are preferably arcuate in form, as seen in plan.

In the form of the invention shown, these scrapers are each mounted on and secured to a plurality of depending rods 48 nearest the periphery and 49 nearest the center, each of which is provided at its lower end with a suitable boss 50 which is, in turn, secured to the blade, and the rods 48 and 49 are further mounted to slide vertically in bosses 51 and 52 on the planetary carrier 17. In the form of the invention shown there are two of these scraper blades 45, one of each of the rods 48 and 49 for each blade, and likewise two of the bosses 52 on the disk 17 for each blade, though the number and arrangement of scrapers is to be determined by the necessities of the particular use to which the apparatus is applied.

These scrapers 45 are adjustable vertically into and out of operative relation to the mix or charge of material to be mixed and the bottom 4 of the container cylinder in any suitable and convenient manner as by means of a vertical shaft 53, which is shown as square, extending through a correspondingly formed opening 54 which is vertical and coaxial with the shaft 18 through which it extends. This shaft 54 extends downwardly into the container, having its lower end 56 near the valve 57, to be described, which valve closes the discharge opening 5 in the bottom wall of the container cylinder.

The sliding shaft 53 carries at its lower end a spider or plurality of arms 58 extending outward from a hub 59 secured to the lower end of the shaft 53 and having at their outer ends bosses 60 through which the scraper rods 49 extend or to which they may be secured in any suitable manner, as by means of set screws 61. The depending shaft or rod 53, in the form of the invention shown, extends above the bevel gear 27 at the top of the hollow shaft 18 and may be provided at its upper end with projecting pins 63, to be engaged by the slotted fork 64 of a bell crank lever 65 pivoted at its intermediate angle at 66 on a bracket 67 supported on the upper part of the machine in any suitable manner, and shown as secured to an upright bracket 68 on the arch 22.

The bell crank lever 65 has an upright arm 69 to which is connected at its upper end a suitable tension member, cord or chain 70 which is led over a pulley 71 on a bracket at the right in Figure 2, and extends downwardly within the reach of the operator.

It will be easily understood that by pulling on the rope or chain 70 the scrapers 45 may be raised and that by releasing the same they move downwardly by gravity into contact with the material being mixed or with floor 4 of the cylindrical container 1.

In the normal operation of the machine in mixing any desired ingredients, the scrapers 45 are preferably elevated above the material and when mixing is completed the valve 57 is opened and the scrapers are lowered to transfer the material from the periphery of the container to the valve opening at the center. It will be understood that the scrapers are preferably controlled by gravity so that they gradually work downward into contact with the floor or bottom wall 4 as the material on the floor is removed.

The transfer of material from the outer periphery to the center is due to the backward inclination of the scrapers from the outer peripheral ends 46 to the inner ends 47 adjacent the valve opening.

In the form of the invention shown in Figure 1, the valve 57 closing the central valve opening of seat 5 is opened upwardly, being operated in any convenient manner. As shown, the valve 57 is controlled and operated by means of a vertical rod 75 which extends upwardly through the center of the rod or shaft 53 which controls the scrapers. This rod 75 is connected to the valve 57 in any suitable manner, as by means of a nut 76 screwed on the bottom of the rod, and it is pivotally connected at its upper end at 77 to an intermediately pivoted, substantially horizontal, lever 78.

This lever 78 is shown as supported intermediately on a stud 79 by which it is fulcrumed on the upper end of the bracket 68. This lever has a rearwardly extending arm 80 opposite the end 77 which may be provided with a counter-balance 81 and operated from beneath by means of a depending rod or tension member 82.

The annular cover plate 12 is shown in Figure 1 as provided with a pipe 84 for the admission of liquid and the vent 85 for the discharge of fumes. To provide heat to the material being mixed when and if heat is necessary, an oil or gas burner 86 is located under the bottom wall or floor 4, the same having an air inlet opening 87 shown at the side and a pipe 88 discharging thereinto either oil or gas under pressure. The pipe 88 may be controlled by a valve 89.

Figure 5:
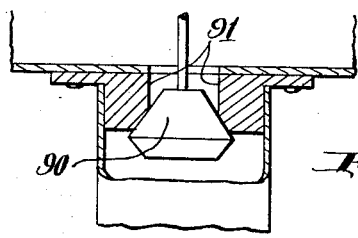
Figure 5 is a fragmentary section corresponding to Figure 2 showing the valve, the valve seat and adjacent parts at the center of the machine in a modified form in which the valve opens downwardly instead of upwardly as in Figure 2.

Figure 5 shows a valve 90 closing the center opening 91 and opening downwardly. This arrangement obviates any tendency to interference by the valve with the scraper arms or spider 58, or shaft 53, which control the vertical position of the scrapers 45, it being understood that when the valve 57, Figure 2, is opened, the scrapers are lowered and this spider or arm member 58 must, therefore, when the valve opens upwardly be placed high enough to be above the valve 57 when the scrapers are lowered and the valve is opened. No such restriction as to the arrangement is present in the form of device illustrated in Figure 5.

Below the floor or bottom wall 4 of the container the cylindrical chamber 92 which, as shown, is integral with the cylinder 1, is lined with fire brick or other vitreous material 93 to retain the heat. This is regular practice in this general type of mixer. The mixing apparatus is ordinarily supported near the top of a chamber, room or bin in which the mixed material is stored, the mixed material being discharged directly into the room or bin after each mixing operation. This practice relates particularly to the mixing of dry materials. For liquid materials any suitable containers may be used.

The operation of the machine is believed to have been quite fully described in connection with the description of its construction. The dry materials to be mixed are introduced through the hopper 11 into the cylinder 1. The liquid materials, if any, may be introduced through the pipe 84. The valve 57 being closed, the scrapers 45 are raised, which may be accomplished by the operator applying tension to the cord or rope 70. Power is then applied by way of the chain 33, rotating the gear train 32, 29, 27, and the shaft 18, which rotates the planetary gear carrier 17 passing the planetary gears 35 about the annulus 15, whereby they are given the planetary action described, i. e., they are rotated bodily about the center of the shaft 18, the cylinder if they are centrally located, and also rotated about their own axes. This gives a corresponding planetary motion of the stirrer carriers 38 carrying at their peripheries the stirring blades 40 which are, in turn, given a planetary motion about the cylinder, the blades being adjusted at any desired distance above the bottom wall 4.

In this manner a most thorough mixing of the contents of the cylinder is accomplished without rotating the container or the batch. When the mixing operation is complete the scrapers 45 are lowered by releasing the cord or rope 70 to which tension has been previously applied. The scrapers then descend by gravity into contact with the material and the valve 57 or 90 being opened upwardly or downwardly by means of the rod 75 and the lever 78 and rod 82, the material is moved toward the center by the scrapers and discharged, the scrapers moving downwardly by gravity as the material is moved.

If heat is essential or desirable to the operation the burner 86 is lighted and any tendency to expansion of the bottom wall or plate 4 is taken up by the expansion joint 8, 9, 10, it being understood that very little heat reaches the outside walls of the container.

I have thus described specifically and in detail a machine embodying my invention in the preferred form in order that the nature and operation and manner of applying and using the invention may be fully understood, however, the specific terms herein are used descriptively rather than in a limiting sense, the scope of the invention being defined in the claims.

What I claim as new and desire to secure by Letters Patent is:

1. A mixing machine comprising a stationary container and stirrer blades therein with means for operating and supporting the stirrer blades to impart a planetary motion to the stirrer blades, a central discharge opening and scrapers for moving the mixed material to the discharge opening, the scrapers having a rotary motion about the discharge opening and being free to move vertically so that they can rest on the material and on the bottom of the container when the material is removed, and means for raising the scrapers during the operation of the machine.

2. In a mixing machine, a stationary container, a top plate having a circular concentric opening, a rotary disk therein and means for driving the same, an annular gear surrounding the opening, planetary gears mounted on the disk engaging the annular gear, stirrers connected to each planetary gear whereby they receive a planetary motion and extending downwards into the container.

3. In a mixing machine, a stationary container, a top plate having a circular concentric opening, a rotary disk therein and means for driving the same, an annular gear surrounding the opening, planetary gears mounted on the disk engaging the annular gear, stirrers connected to each planetary gear and extending downwards into the container, the container having a central discharge opening, scrapers connected to the rotating disk extending from a point near the periphery of the container to a point near the discharge opening and inclined reversely to the directon of rotation from the periphery toward the discharge opening.

4. In a mixing machine, a stationary container, a top plate having a circular concentric opening, a rotary disk therein and means for driving the same, an annular gear concentric with the opening, planetary gears mounted on the disk engaging the annular gear, stirrers connected to each planetary gear and extending downwards into the container, the container having a central discharge opening, scrapers carried by the rotating disk extending from a point near the periphery to a point near the discharge opening and inclined reversely to the direction of rotation from the periphery toward the discharge opening, the scrapers being mounted on vertical shafts which are free to move downward by gravity into contact with the material and the bottom of the container.

5. In a mixing machine, a stationary container, a top plate having a circular concentric opening, a rotary disk therein and means for driving the same, an annular gear surrounding the opening, planetary gears mounted on the disk engaging the annular gear, stirrers connected to the planetary gears and extending downwards into the container, the container having a central discharge opening, scrapers connected to the rotating disk extending from a point near the periphery to a point near the discharge opening and inclined reversely to the direction of rotation from the periphery toward the discharge opening, the scrapers being free to move in a vertical direction, and means for raising the scrapers.

6. In a mixing machine, a stationary container, a gear carried and means for rotating the same about a central point, a planetary gear on the carrier and a relatively stationary gear engaged thereby giving said gear a planetary rotation, a stirrer connected to the planetary gear to be operated thereby, a discharge opening and a scraper for moving the material to the discharge opening, the scraper being carried by the gear carrier.

7. In a mixing machine, a stationary container, a gear carrier and means for rotating the same about a central point, a planetary gear on the carrier and a relatively stationary gear engaged thereby giving said gear a planetary rotation, a stirrer connected to the planetary gear to be operated thereby, a discharge opening and a scraper for moving the material to the discharge opening, the scraper being carried by the gear carrier and being free to move vertically so that it rests on the material and then on the bottom of the container.

8. In a mixing machine, a stationary container, a gear carrier and means for rotating the same about a central point, a planetary gear on the carrier and a relatively stationary gear engaged thereby giving said gear a planetary rotation, a stirrer connected to the planetary gear to be operated thereby, a discharge opening and a scraper for moving the material to the discharge opening, the scraper being carried by the gear carrier, the discharge opening being at the center and the scraper being inclined oppositely to the direction of rotation from the periphery toward the center.

9. In a mixing machine, a stationary container, a gear carrier and means for rotating the same about a central point, a planetary gear on the carrier and a relatively stationary gear engaged thereby giving said gear a planetary rotation, a stirrer connected to the planetary gear to be operated thereby, a discharge opening and a scraper for moving the material to the discharge opening, the scraper being carried by the gear carrier, the discharge opening being at the center and the scraper being inclined oppositely to the direction of rotation from the periphery toward the center, the scraper being free to move vertically so that it rests on the material or on the bottom of the container, and means for supporting the scraper in raised position.

10. In a mixing machine, a stationary container, a gear carrier and means for rotating the same about a central point, a planetary gear on the carrier and a relatively stationary gear engaged thereby giving said gear a planetary rotation, a stirrer connected to the planetary gear to be operated thereby, a discharge opening, a valve to close the same and a scraper for moving the material to the discharge opening, the scraper being carried by the gear carrier, the discharge opening being at the center and the scraper being inclined oppositely to the direction of rotation from the periphery toward the center, the scraper being free to move vertically so that it rests on the material or on the bottom of the container, means for supporting the scraper in raised position and means controlling the valve for opening the same from outside the container.

11. In a mixing machine, a stationary container, a gear carrier and means for rotating the same about a central point, a planetary gear on the same about a central point, a planetary gear on the carrier and a relatively stationary gear engaged thereby giving said gear a planetary rotation, a stirrer connected to the planetary gear to be operated thereby, a discharge opening, a valve to close the same and a scraper for moving the material to the discharge opening, the scraper being carried by the gear carrier, the discharge opening being at the center and the scraper being inclined oppositely to the direction of rotation from the periphery toward the center, the scraper being free to move vertically so that it rests on the material or on the bottom of the container and means operable from outside for raising the scraper and means controlling the valve for opening the same from outside the container.

12. In a mixing machine, a container, the container having a bottom wall, means for heating the container from beneath, a side wall and a slip joint between the side wall and the bottom wall providing for free expansion and contraction of the bottom wall relatively to the side wall.

13. In a mixing machine, a container, the container having a bottom wall, means for heating the container from beneath, a side wall and a slip joint between the side wall and the bottom wall providing for free expansion and contraction of the bottom wall relatively to the side wall, the outer edge of the bottom wall being beveled to avoid packing of the material.

14. In a mixing machine, a container, having side walls and a bottom wall, means for heating the container from beneath, the container having an internal peripheral support on which the edge portion of the bottom wall rests and on which the bottom wall is free to slide as it expands and contracts relatively to the side walls.

15. In a mixing machine, a container having side walls and a bottom wall, means for heating the container from beneath, the container having an internal peripheral surface on which the edges of the side walls rest and relatively to which they are free to slide, the outer edge of the bottom wall being beveled to avoid packing of the material.

Signed by me at Baltimore, Maryland, this 9th day of July, 1928.

AUGUSTUS J. SACKETT.